US006059346A

United States Patent [19]

Moon

[11] Patent Number: 6,059,346

[45] Date of Patent: May 9, 2000

[54] DEVICE FOR OPENING AND CLOSING TRUNK LID

[75] Inventor: Su Dong Moon, Kyungsangnam-Do, Rep. of Korea

[73] Assignee: Hyundai Motor Company, Seoul, Rep. of Korea

[21] Appl. No.: 08/994,262

[22] Filed: Dec. 19, 1997

[30] Foreign Application Priority Data

Dec. 21, 1996 [KR] Rep. of Korea ...................... 96-69709

[51] Int. Cl.[7] ...................................................... B62D 25/10

[52] U.S. Cl. ............................ 296/76; 296/146.4; 92/75; 60/410

[58] Field of Search .................................. 296/76, 146.4; 49/386; 92/151, 61, 75; 60/410; 91/454

[56] References Cited

U.S. PATENT DOCUMENTS

| | | | |
|---|---|---|---|
| 3,492,920 | 2/1970 | Czajkowski | 95/75 X |
| 5,788,312 | 8/1998 | Lee | 296/76 |

FOREIGN PATENT DOCUMENTS

| | | | |
|---|---|---|---|
| 2-14980 | 1/1990 | Japan | 296/146.4 |
| 2-14981 | 1/1990 | Japan | 296/146.4 |
| 3105867 | 9/1982 | United Kingdom | 296/146.4 |

*Primary Examiner*—D. Glenn Dayoan
*Assistant Examiner*—Jason Morrow
*Attorney, Agent, or Firm*—Christie, Parker & Hale, LLP

[57] ABSTRACT

A device for opening and closing a trunk lid comprises: a trunk lid opening/closing switch operated between an opening mode and a closing mode; a cylinder having one end rotatably fixed to a body panel; a piston dividing a space within the cylinder into a first chamber and a second chamber; a piston rod having one end rotatably fixed to the trunk lid; and a pneumatic section for selectively supplying compressed air into one of the first and second chambers and discharging air in the other one of the first and second chambers, out of the cylinder, according to an operation of the trunk lid opening/closing switch.

16 Claims, 2 Drawing Sheets

DEVICE FOR OPENING AND CLOSING TRUNK LID

BACKGROUND OF THE INVENTION

1. Field of the Invention

The present invention relates to a device for opening and closing a trunk lid of an automobile, and more particularly to a device for opening and closing a trunk lid, which is so structured as to be able to automatically open and close a trunk lid depending upon operation of a switch, whereby it improves convenience for a driver and enhances the value of an automobile.

2. Description of the Related Art

A trunk room defined in a rear portion of an automobile is covered by a trunk lid. A rear end of a trunk lid hinge member is fixed to a front end of the trunk lid in a lengthwise direction of the automobile, and a front end of the trunk lid hinge member is pivotally fixed to a package tray panel which is positioned behind a rear seat. Adjacent to the front end of the trunk lid hinge member, one end of a torsion bar is connected to a portion of the trunk lid hinge member, and the other end of the torsion bar is fastened to a proper portion of a body panel. The torsion bar allows the opening and closing operation for the trunk lid to be smoothly performed with a small force.

A trunk lid latch is fixed to a rear end of the trunk lid in the lengthwise direction of the automobile in such a manner that it can be rotated around a hinge shaft, and a striker is fastened to a point on the body panel, which corresponds to the position of the trunk lid latch. Beside the trunk lid latch, a pawl is provided to the trunk lid, and the pawl functions to hold engagement between the trunk lid latch and the striker. By pulling a trunk lid lever which is provided in a cabin and connected via a wire to the pawl or rotating the pawl by using a key in the outside, the engagement between the trunk lid latch and the pawl can be released, and accordingly, the trunk lid can be manually opened, or closed after being used.

However, in the structure for opening and closing a trunk lid, constructed as mentioned above according to the related art, even when the engagement state between the trunk lid latch and the striker is released, the trunk lid is only maintained in a state that it is popped up, and thereby in order to completely open and close the trunk lid, it is further needed to manually raise and lower the trunk lid.

SUMMARY OF THE INVENTION

Accordingly, the present invention has been made in an effort to solve one or more of the above-described problems occurring in the related art, and an object of the present invention is to provide a device for opening and closing a trunk lid, which is so structured as to be able to automatically open and close a trunk lid depending upon operation of a switch, whereby it improves convenience for a driver and enhances the value of an automobile.

According to one aspect of the present invention, there is provided a device for opening and closing a trunk lid comprising: a trunk lid opening/closing switch operated between an opening mode and a closing mode; a cylinder having one end rotatably fixed to a body panel; a piston dividing a space within the cylinder into a first chamber and a second chamber; a piston rod having one end rotatably fixed to the trunk lid; and a pneumatic section for selectively supplying compressed air into one of the first and second chambers and discharging air in the other one of the first and second chambers, out of the cylinder, according to an operation of the trunk lid opening/closing switch.

According to another aspect of the present invention, the pneumatic section comprises: a compressed air supplying station communicated with each of the first chamber and the second chamber via a pneumatic line; a first valve for valving compressed air supplying operation into the first chamber or the second chamber; a second valve for discharging air in the first chamber or the second chamber, out of the cylinder; and a control section for controlling opening and closing of the first valve and the second valve, according to the switching operation of the trunk lid opening/closing switch.

According to another aspect of the present invention, the first valve comprises a first solenoid valve and a second solenoid valve disposed in portions of the pneumatic line, respectively, which are communicated with the first chamber and the second chamber; and the second valve comprises a third solenoid valve and a fourth solenoid valve installed at wall portions of the cylinder, respectively, which define the first chamber and the second chamber.

According to another aspect of the present invention, the control section comprises a first relay for opening the first and fourth solenoid valves and closing the second and third solenoid valves in the opening mode of the trunk lid opening/closing switch and for closing the first and fourth solenoid valves and opening the second and third solenoid valves in the closing mode of the trunk lid opening/closing switch.

According to another aspect of the present invention, the device further comprises: a compressor connected to the compressed air supplying station and operated at the opening mode and the closing mode of the trunk lid opening/closing switch; and a sensor for measuring pressure in the compressed air supplying station and stopping operation of the compressor when the pressure in the compressed air supplying station is larger than a predetermined value.

According to another aspect of the present invention, the trunk lid opening/closing switch operates among the opening mode, the closing mode and a neutral mode; and the sensor returns the trunk lid opening/closing switch into the neutral mode when it stops the operation of the compressor.

According to another aspect of the present invention, the device further comprises a clutch connected to the sensor for turning on or off the compressor.

According to another aspect of the present invention, the device includes a pair of pistons disposed in the cylinder; a piston rod of a first piston is rotatably fixed to the body panel and a piston rod of a second piston is rotatably fixed to the trunk lid; and the space within the cylinder is divided into first and second chambers defined between both ends of the cylinder and each of the pistons, respectively, and into a third chamber defined between the pair of pistons.

According to another aspect of the present invention, in the opening mode of the trunk lid opening/closing switch, compressed air is supplied into the second chamber and air in the first and third chambers is discharged out of the cylinder; and in the closing mode of the trunk lid opening/closing switch, compressed air is supplied into the first and third chambers and air in the second chamber is discharged out of the cylinder.

According to another aspect of the present invention, a compressed air supplying operation and an air discharging operation for the first and third chambers are simultaneously carried out.

According to another aspect of the present invention, the device further comprises a fifth solenoid valve for discharging air in the third chamber out of the cylinder, and a second relay for controlling an operation of the fifth solenoid valve.

According to another aspect of the present invention, the second relay simultaneously controls both operations of the fourth and fifth solenoid valves.

According to still another aspect of the present invention, at least one stopper is formed in an inner surface of the cylinder for limiting a stroke of the pair of pistons.

According to yet still another aspect of the present invention, each of the first and second relay comprises a solenoid capable of being energized according to the switching operation of the trunk lid opening/closing switch; and a contact member opened or closed according to an energized state and non-energized state of the solenoids.

By the features of the present invention, it becomes possible to automatically fully open and close a trunk lid depending upon a simple switching operation, whereby convenience for a driver is improved and the value of an automobile is enhanced.

BRIEF DESCRIPTION OF THE DRAWINGS

The above objects, and other features and advantages of the present invention will become more apparent by describing in detail a preferred embodiment thereof with reference to the drawings, in which.

DETAILED DESCRIPTION OF PREFERRED EMBODIMENTS

Figure 1:
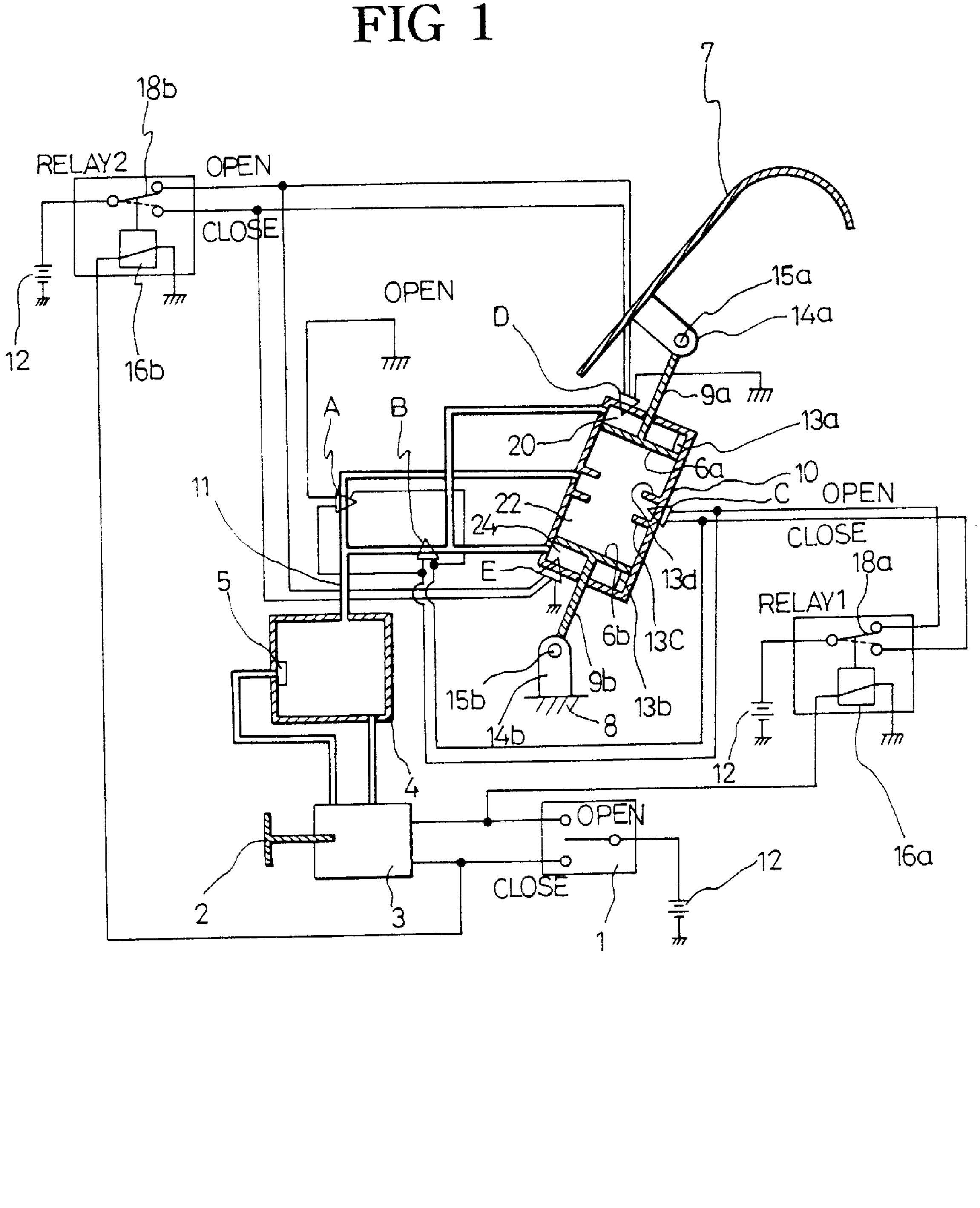
FIG. 1 is a circuit diagram illustrating the whole construction of a device for opening and closing a trunk lid in accordance with an embodiment of the present invention.

Reference will now be made in greater detail to a preferred embodiment of the invention, an example of which is illustrated in the accompanying drawings. Wherever possible, the same reference numerals will be used throughout the drawings to refer to the same or like parts.

Figure 2:
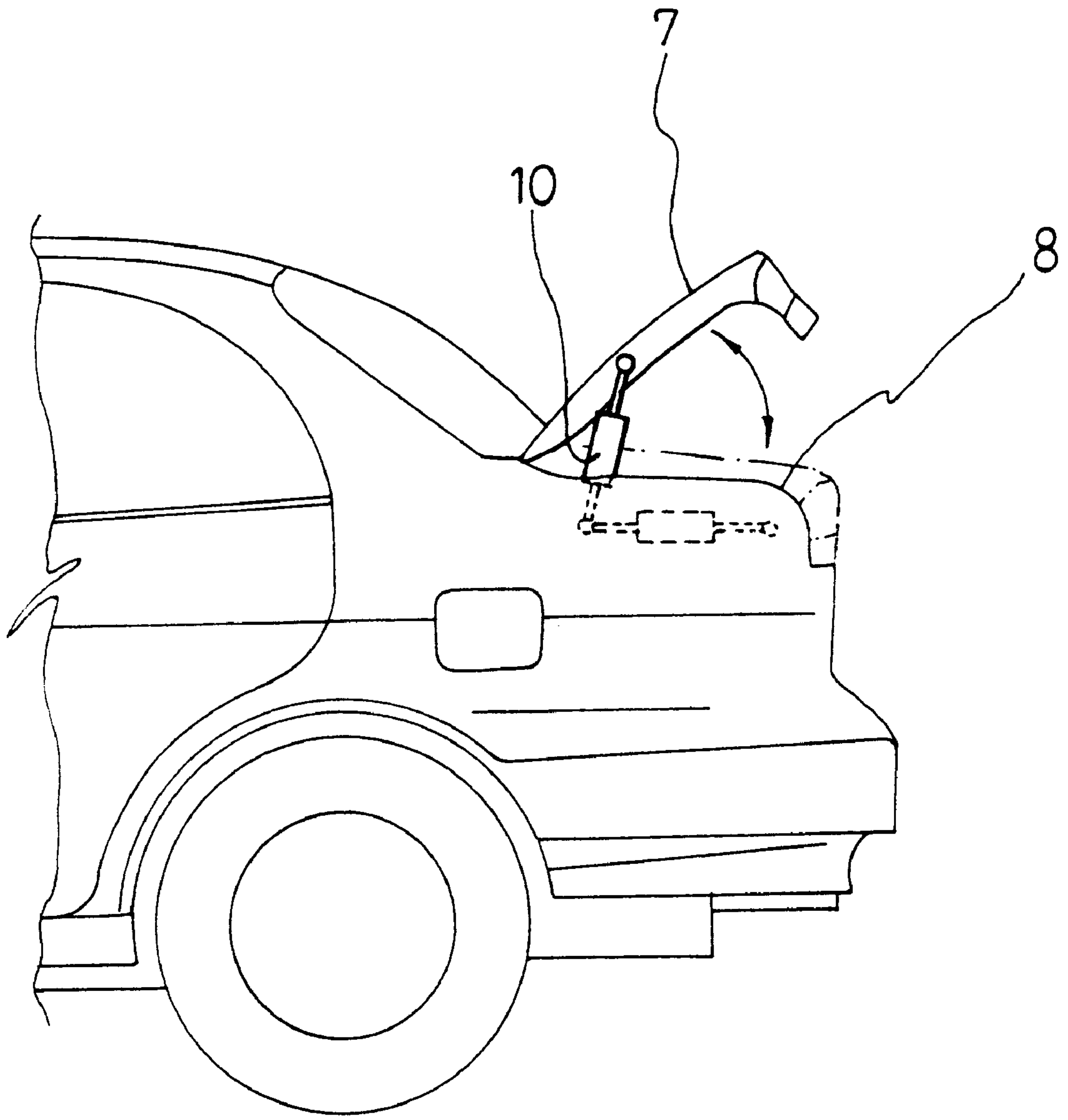
FIG. 2 is a side view schematically illustrating an operation of the device for opening and closing a trunk lid according to the present invention, in a trunk lid opening position and a trunk lid closing position.

Referring to FIG. 1, there is illustrated a circuit diagram showing the whole construction of a device for opening and closing a trunk lid in accordance with an embodiment of the present invention, and FIG. 2 is a side view schematically illustrating an operation of the device for opening and closing a trunk lid according to the present invention, in a trunk lid opening position and a trunk lid closing position.

A device for opening and closing a trunk lid according to the present invention includes a trunk lid opening/closing switch 1, and the trunk lid opening/closing switch 1 can be operated among an opening mode, a closing mode and a neutral mode. A trunk lid 7 is automatically and completely opened at the opening mode of the trunk lid opening/closing switch 1, which is automatically and completely closed at the closing mode of the trunk lid opening/closing switch 1, and is maintained in a completely opened position and a completely closed position at the neutral mode of the trunk lid opening/closing switch 1.

The trunk lid opening/closing switch 1 is connected to a compressor 3, and the compressor 3 is connected to a compressed air supplying station 4. The compressor 3 operates when the trunk lid opening/closing switch 1 is in the opening mode and the closing mode. When being operated, the compressor 3 compresses air and stores compressed air into the compressed air supplying station 4. The compressed air supplying station 4 is equipped with a pressure sensor 5, and the pressure sensor 5 measures a pressure in the compressed air supplying station 4. When the pressure in the compressed air supplying station 4 is larger than a predetermined value, the pressure sensor 5 disconnects a clutch 2 which is provided adjacent to the compressor 3, to stop the operation of the compressor 3. Accordingly, the compressor 3 operates when being connected with the clutch 2, and does not operated when being disconnected from the clutch 2. At the time when the pressure sensor 5 stops the operation of the compressor 3, the pressure sensor 5 simultaneously returns the trunk lid opening/closing switch 1 to the neutral mode.

A cylinder 10 is connected via a pneumatic line 11 to the compressed air supplying station 4, and a pair of pistons **6*a* and 6*b* are reciprocatingly disposed inside the cylinder 10. A space inside the cylinder 10 is divided into three chambers by the pair of pistons 6*a* and 6*b*. A first chamber 20 is defined between an upper end wall of the cylinder 10 and a first piston 6*a*, a second chamber 22 is defined between the first piston 6*a* and a second piston 6*b*, and a third chamber 24 is defined between the second piston 6*b* and a lower end wall of the cylinder 10. The pneumatic line 11 branches off into three sections to communicate the compressed air supplying station 4 with the respective chambers 20, 22 and 24**.

A first hinge bracket **14*a* is fastened to a lower surface of the trunk lid 7, and a first piston rod 9*a* of the first piston 6*a* is fixed to the first hinge bracket 14*a* such that it can be rotated around a first hinge shaft 15*a*. A second hinge bracket 14*b* is fastened to the a body panel 8 below the trunk lid 7, and a second piston rod 9*b* of the second piston 6*b* is fixed to the second hinge bracket 14*b* such that it can be rotated around a second hinge shaft 15*b***.

A first solenoid valve A is disposed in a portion of the pneumatic line 11, which is connected to the second chamber 22, and a second solenoid valve B is disposed in a portion of the pneumatic line 11, which is connected to the first chamber 20 and the third chamber 24. The compressed air supplying station 4 selectively supplies compressed air into the first and third chambers 20 and 24 or into the second chamber 22, when the first solenoid valve A and the second solenoid valve B disposed in the course of the pneumatic line 11 are opened or closed. A third solenoid valve C is installed in a wall portion of the cylinder 10, which defines the second chamber 22, and fourth and fifth solenoid valves D and E are respectively installed in end wall portions of the cylinder 10, which define the first chamber 20 and the third chamber 24, respectively. The first solenoid valve A, second solenoid valve B and third solenoid valve C are connected to a first relay RELAY1 via wires, and the fourth solenoid valve D and the fifth solenoid valve E are connected to a second relay RELAY2 via wires.

The first and second relays RELAY1 and RELAY2 include solenoids **16*a* and 16*b* and contact members 18*a* and 18*b*, respectively. A first solenoid 16*a* of the first relay RELAY1 is connected to an open position of the trunk lid opening/closing switch 1, and a second solenoid 16*b* of the second relay RELAY2 is connected to a closed position of the trunk lid opening/closing switch 1. An operating terminal of the trunk lid opening/closing switch 1 is connected to a battery 12**.

Hereinafter, a procedure for opening or closing the solenoid valves A, B, C, D and E as current is applied to the first and second relays RELAY1 and RELAY2 by operation of the trunk lid opening/closing switch 1, will be explained in detail. In FIG. 1, opened conditions of the solenoid valves A, B, C, D and E are illustrated as "OPEN", and closed conditions thereof are illustrated as "CLOSE".

When the trunk lid opening/closing switch 1 is maintained in the opening mode, current is applied from the battery 12 to the first solenoid 16*a* of the first relay RELAY1 via the open end of the trunk lid opening/closing switch 1, and the contact member 18*a* of the first relay RELAY1 is detached from an open end and contacted with a close end. If the contact member 18*a* of the first relay RELAY1 is switched to the close end, the second solenoid valve B and the third solenoid valve C are closed, and the first solenoid valve A is opened. While the trunk lid opening/closing switch 1 is maintained in the opening mode, the contact member 18*b* of the second relay RELAY2 is held in a state that it is switched to an open end thereof. In this situation, the fourth solenoid valve D and the fifth solenoid valve E are opened. Accordingly, in the opening mode of the trunk lid opening/closing switch 1, compressed air is supplied from the compressed air supplying station 4 into the second chamber 22 through the first solenoid valve A which is opened, and air in the first chamber 20 and the third chamber 24 is discharged out through the fourth solenoid valve D and the fifth solenoid valve E which are opened, respectively. At this time, the second solenoid valve B for supplying compressed air to the first chamber 20 and the third chamber 24 and the third solenoid valve C for communicating with the second chamber 22 with the outside, are held in a closed position. Therefore, by a pressure of the compressed air supplied into the second chamber 22, the pistons 6*a* and 6*b* are biased toward both ends of the cylinder 10, respectively, and the piston rods 9*a* and 9*b* are projected to the outside, whereby the trunk lid 7 is moved toward the completely-opened position. If the trunk lid 7 reaches to the completely-opened position, since a pressure in the compressed air supplying station 4 increases, the pressure sensor 5 stops the operation of the compressor 3 and returns the trunk lid opening/closing switch 1 to its neutral mode.

When the trunk lid opening/closing switch 1 is maintained in the closing mode, current is applied from the battery 12 to the second solenoid 16*b* of the second relay RELAY2 via the close end of the trunk lid opening/closing switch 1, and the contact member 18*b* of the second relay RELAY2 is switched from an open end to a close end. If the contact member 18*b* of the second relay RELAY2 is switched to the close end, the fourth solenoid valve D and the fifth solenoid valve E are closed. While the trunk lid opening/closing switch 1 is maintained in the closing mode, the contact member 18*a* of the first relay RELAY1 is held in a state that is switched to an open end thereof. In this state, the second solenoid valve B and the third solenoid valve C are opened, and the first solenoid valve A is closed. Accordingly, in the closing mode of the trunk lid opening/closing switch 1, compressed air is supplied into the first chamber 20 and the third chamber 24 through the second solenoid valve B which is opened, and air in the second chamber 22 is discharged out through the third solenoid valve C which is opened. At this time, the first solenoid valve A for supplying compressed air with the second chamber 22 and the fourth solenoid valve D and the fifth solenoid valve E for communicating the first chamber 20 and the third chamber 24 with the outside, are held in a closed position. Therefore, by pressure of the compressed air supplied into the first and third chambers 20 and 24, the pistons 6*a* and 6*b* are biased toward a center of the cylinder 10, and the piston rods 9*a* and 9*b* are inserted into the cylinder 10, whereby the trunk lid 7 is moved toward the completely-closed position. If the trunk lid 7 reaches to the completely-closed position, since a pressure in the compressed air supplying station 4 increases, the pressure sensor 5 stops the operation of the compressor 3 and returns the trunk lid opening/closing switch 1 into its neutral mode.

A pair of stopper members 13*a* and 13*b* are disposed in inner surfaces of both ends of the cylinder 10, respectively, and a pair of stopper projections 13*c* and 13*d* are integrally and radially projected from an inner surface of a middle portion of the cylinder 10 such that they are spaced apart from each other. The pair of stopper members 13*a* and 13*b* and the pair of stopper projections 13*c* and 13*d* functions to limit strokes of the pair of pistons 6*a* and 6*b*.

As a result, according to the device for opening and closing a trunk lid, of the present invention, it becomes possible to automatically and fully open and close a trunk lid depending upon a simple switching operation, whereby convenience for a driver is improved and the value of an automobile is enhanced.

In the drawings and specification, there have been disclosed typical preferred embodiments of the invention and, although specific terms are employed, they are used in a generic and descriptive sense only and not for purposes of limitation, the scope of the invention being set forth in the following claims. For example, although it is explained in the illustrated embodiment that the third chamber 24 are formed in a lower ends of the cylinder 10, the second piston 6*b* is provided in the third chamber 24 and the second piston rod 9*b* is fastened to the body panel 8, it is to be readily understood that the second piston 6*b* and the second piston rod 9*b* can be omitted such that a space inside the cyliner is divided into two chambers partitioned by the first piston 6*a*.

What is claimed is:

1. A device for opening and closing a trunk lid, comprising:

a trunk lid opening/closing switch operable between an opening mode and a closing mode;

a cylinder having one end rotatably connected to a body panel of a vehicle;

a piston dividing a space within the cylinder into a first chamber and a second chamber;

a piston rod having one end rotatably connected to the trunk lid;

a compressed air supplying station in communication with each of the first chamber and second chambers via a pneumatic line;

a first solenoid valve coupled to the pneumatic line controlling the supplying of compressed air into the first chamber;

a second solenoid valve coupled to the pneumatic line coupled to the pneumatic line controlling the supplying of compressed air into the second chamber;

a third solenoid valve installed at a wall portion of the cylinder defining the first chamber for controlling the discharge of air from the first chamber of the cylinder;

a fourth solenoid valve installed at a wall portion of the cylinder defining the second chamber for controlling the discharge of air from the second chamber of the cylinder; and control means for controlling the first, second, third and fourth valves according to the operation of the trunk lid opening/closing switch.

2. A device for opening and closing a trunk lid as claimed in claim 1, wherein the control means comprises first relay means for opening the first and fourth solenoid valves and closing the second and third solenoid valves in the opening mode of the trunk lid opening/closing switch and for closing the first and fourth solenoid valves and opening the second and third solenoid valves in the closing mode of the trunk lid opening/closing switch.

3. A device for opening and closing a trunk lid as claimed in claim 1, further comprising:

a compressor connected to the compressed air supplying station and operated at the opening mode and the closing mode of the trunk lid opening/closing switch; and sensor means for measuring a pressure in the compressed air supplying station and stopping an operation of the compressor when the pressure in the compressed air supplying station is larger than a predetermined value.

4. A device for opening and closing a trunk lid as claimed in claim 3, wherein the trunk lid opening/closing switch is operated among the opening mode, the closing mode and a neutral mode; and the sensor means returns the trunk lid opening/closing switch into the neutral mode when it stops the operation of the compressor.

5. A device for opening and closing a trunk lid as claimed in claim 3, further comprising:

a clutch connected to the sensor means for turning on or off the compressor.

6. A device for opening and closing a trunk lid, comprising:

a trunk lid opening/closing switch operable between an opening mode and a closing mode;

a cylinder having one end rotatably fixed to a body panel;

a piston dividing a space within the cylinder into a first chamber and a second chamber;

a piston rod having one end rotatably connected to the trunk lid;

pneumatic means for selectively supplying compressed air into one of the first and second chambers and discharging air from the other one of the first and second chambers according to the operation of the trunk lid opening/closing switch, the pneumatic means comprising a compressor for generating the compressed air; and a sensor means for measuring pressure in the pneumatic means, wherein the trunk lid opening/closing switch is operated among the opening mode, the closing mode, and a neutral mode, and wherein the sensor means returns the trunk lid opening/closing switch into the neutral mode when the sensor means stops the operation of the compressor when the pressure of the compressed air is greater than a predetermined value.

7. A device for opening and closing a trunk lid, comprising a trunk lid opening/closing switch operable between an opening mode and a closing mode;

a cylinder having one end rotatably fixed to a body panel;

a piston dividing a space within the cylinder into a first chamber and a second chamber;

a piston rod having one end rotatably connected to the trunk lid;

pneumatic means for selectively supplying compressed air into one of the first and second chambers and discharging air from the other one of the first and second chambers according to the operation of the trunk lid opening/closing switch, the pneumatic means comprising a compressor for generating the compressed air;

a sensor means for measuring pressure in the pneumatic means, wherein the trunk lid opening/closing switch is operated among the opening mode, the closing mode, and a neutral mode, and wherein the sensor means returns the trunk lid opening/closing switch into the neutral mode when the sensor means stops the operation of the compressor when the pressure of the compressed air is greater than a predetermined value; and a clutch connected to the sensor means for turning on or off the compressor.

8. A device for opening and closing a trunk lid, comprising:

a trunk lid opening/closing switch operable between an opening mode and a closing mode;

a cylinder having an internal space;

a pair of pistons disposed within the cylinder internal space, each piston comprising a piston rod, wherein a piston rod of the first piston is rotatably connected to a body panel of a vehicle, wherein a piston rod of the second piston is rotatably connected to the trunk lid of the vehicle, and wherein the pair of pistons divide the internal space into a first chamber between an end of the cylinder and the first piston, a second chamber between the second piston and the other end of the cylinder, and a third chamber between the two pistons;

a compressed air supplying station in communication with each of the first chamber, second chamber and third chamber;

a first solenoid valve coupled to coupled to the first and second chambers for controlling the amount of compressed air being supplied to the first and second chambers;

a second solenoid valve coupled to the third chamber for controlling the amount of compressed air being supplied into the third chamber;

a third solenoid valve coupled to the first chamber for controlling the discharge of air from the first chamber of the cylinder;

a fourth solenoid valve coupled to the second chamber for controlling the discharge of air from the second chamber of the cylinder;

a fifth solenoid valve coupled to the third chamber for controlling the discharge of air from the third chamber of the cylinder; and control means for controlling the first, second, third, fourth and fifth valves according to the operation of the trunk lid opening/closing switch.

9. A device for opening and closing a trunk lid as claimed in claim 8, wherein at least one stopper means is formed in an inner surface of the cylinder for limiting a stroke of the pair of pistons.

10. A device for opening and closing a trunk lid as claimed in claim 8 wherein the control means comprises a first and a second relay means wherein each of the first and second relay means comprises: a solenoid capable of being energized according to the switching operation of the trunk lid opening/closing switch; and a contact member opened or closed according to an energized state and non-energized state of the solenoids.

11. A device for opening and closing a trunk lid as claimed in claim 8 wherein the control means comprises a relay means for controlling the operation of the fifth valve.

12. A device for opening and closing a trunk lid as claimed in claim 11 wherein the relay means simultaneously controls the operations of the first, second and fifth solenoid valves.

13. A device for opening and closing a trunk lid as claimed in claim 8 wherein the control means comprises a relay means for controlling the operation of the first and fifth valves.

14. A device for opening and closing a trunk lid as claimed in claim 8, wherein the control means comprises:

a first relay switch for opening the second valve and closing the first and fifth valves in the open mode of the trunk lid opening/closing switch and for closing the second valve and opening the first and fifth valves when in the closed mode of the trunk lid opening/closing switch; and a second relay switch for controlling the operation of the third and fourth valves, wherein the third and the fourth valves are opened when the trunk lid opening/closing switch is in the open mode and are closed when the trunk lid opening/closing switch is in the closed mode.

15. A device for opening and closing a trunk lid, comprising:

a trunk lid opening/closing switch operable between an opening mode and a closing mode;

an actuator housing having one end rotatably connected to a body panel of a vehicle;

a piston dividing a space within the actuator housing into a first chamber and a second chamber;

a piston rod having one end rotatably connected to the trunk lid;

a compressed fluid supply coupled to each of the first chamber and second chambers for supplying compresses fluid to the first and second chambers;

a first valve coupled to the first chamber for controlling the amount of compresses fluid being supplied to the first chamber;

a second valve coupled to the second chamber for controlling the amount of compresses fluid being supplied to the second chamber;

a third valve coupled to first chamber for controlling the discharge of fluid from the first chamber;

a fourth valve coupled to the second chamber for controlling the discharge of fluid from the second chamber of the cylinder; and control means for controlling the first, second, third and fourth valves according to the operation of the trunk lid opening/closing switch.

16. A device for opening and closing a trunk lid, comprising a trunk lid opening/closing switch operable between an opening mode and a closing mode;

an actuator housing having internal space;

a pair of pistons disposed within the housing internal space, each piston comprising a piston rod, wherein a piston rod of the first piston is rotatably connected to a body panel of a vehicle, wherein a piston rod of the second piston is rotatably connected to the trunk lid of the vehicle, and wherein the pair of pistons divide the internal space into a first chamber between an end of the housing and the first piston, a second chamber between the second piston and the other end of the housing, and a third chamber between the two pistons;

a compressed fluid supply for supplying compressed fluid to the first chamber, second chamber and third chamber;

a first valve coupled to the first and second chambers for controlling the amount of compressed fluid being supplied to the first and second chambers;

a second valve coupled to the third chamber for controlling the amount of compressed fluid being supplied into the third chamber;

a third solenoid valve coupled to the first chamber for controlling the discharge of fluid from the first chamber;

a fourth valve coupled to the second chamber for controlling the discharge of fluid from the second chamber;

a fifth valve coupled to the third chamber for controlling the discharge of fluid from the third chamber; and control means for controlling the first, second, third, fourth and fifth valves according to the operation of the trunk lid opening/closing switch.

* * * * *